(12) United States Patent
Kim et al.

(10) Patent No.: US 8,301,107 B2
(45) Date of Patent: Oct. 30, 2012

(54) METHOD OF CONNECTING TO NETWORK IN BROADBAND WIRELESS ACCESS SYSTEM

(75) Inventors: Yong-Ho Kim, Bucheon (KR); Jin Lee, Seoul (KR); Yong-Won Kwak, Anyang (KR)

(73) Assignee: LG Electronics Inc., Seoul (KR)

( * ) Notice: Subject to any disclaimer, the term of this patent is extended or adjusted under 35 U.S.C. 154(b) by 771 days.

(21) Appl. No.: 12/354,656

(22) Filed: Jan. 15, 2009

(65) Prior Publication Data

US 2009/0196228 A1 Aug. 6, 2009

Related U.S. Application Data

(62) Division of application No. 11/388,870, filed on Mar. 24, 2006, now Pat. No. 7,664,480.

(30) Foreign Application Priority Data

Mar. 24, 2005 (KR) .......... 10-2005-0024698
Mar. 24, 2005 (KR) .......... 10-2005-0024701

(51) Int. Cl.
*H04B 1/16* (2006.01)
(52) U.S. Cl. .......... 455/343.2; 370/328; 370/331; 703/13
(58) Field of Classification Search .......... 455/343.2; 370/328, 331; 703/13
See application file for complete search history.

(56) References Cited

U.S. PATENT DOCUMENTS

| | | | |
|---|---|---|---|
| 5,870,588 A * | 2/1999 | Rompaey et al. .......... | 703/13 |
| 6,456,608 B1 | 9/2002 | Lomp | |
| 6,542,490 B1 | 4/2003 | Ahmadvand et al. | |
| 6,606,744 B1 | 8/2003 | Mikurak | |
| 6,671,818 B1 | 12/2003 | Mikurak | |
| 6,697,350 B2 | 2/2004 | Lomp | |
| 6,707,805 B2 | 3/2004 | Ozluturk et al. | |
| 6,721,301 B2 | 4/2004 | Ozluturk et al. | |
| 6,738,981 B1 | 5/2004 | Tonnby et al. | |
| 6,788,662 B2 | 9/2004 | Ozluturk et al. | |
| 6,816,473 B2 | 11/2004 | Ozluturk et al. | |
| 6,940,840 B2 | 9/2005 | Ozluturk et al. | |
| 6,983,009 B2 | 1/2006 | Lomp | |
| 7,307,973 B2 * | 12/2007 | Song et al. .......... | 370/331 |

(Continued)

FOREIGN PATENT DOCUMENTS

CN 1522077 8/2004

(Continued)

OTHER PUBLICATIONS

A. De La Oliva et al., "An Overview of IEEE 802.21: Media Independent Handover Services," IEEE Wireless Communications, vol. 15, No. 4, Aug. 2008.

(Continued)

*Primary Examiner* — William D Cumming
(74) *Attorney, Agent, or Firm* — Lee, Hong, Degerman, Kang & Waimey

(57) ABSTRACT

The primitives between an upper management layer and the MAC layer within a mobile station and a base station are defined in order to specify and clarify the operations within the protocol stack layers in a broadband wireless access system to allow a mobile station to perform a method of connecting to the network. Media Independent Handover (MIH) procedures can be achieved because the NCMS and MIH layer can communicate through use of these primitives.

7 Claims, 17 Drawing Sheets

U.S. PATENT DOCUMENTS

| | | |
|---|---|---|
| 7,363,038 B2 | 4/2008 | Kim et al. |
| 7,626,961 B2 * | 12/2009 | Kim et al. ............ 370/328 |
| 7,664,480 B2 * | 2/2010 | Kim et al. ............ 455/343.2 |
| 2004/0114566 A1 | 6/2004 | Lim et al. |
| 2004/0208160 A1 | 10/2004 | Petrovic et al. |
| 2005/0043050 A1 | 2/2005 | Lee et al. |
| 2005/0286451 A1 | 12/2005 | Kim et al. |
| 2006/0227746 A1 | 10/2006 | Kim et al. |
| 2006/0227747 A1 | 10/2006 | Kim et al. |
| 2006/0229075 A1 | 10/2006 | Kim et al. |
| 2006/0230151 A1 | 10/2006 | Kim et al. |
| 2006/0233198 A1 | 10/2006 | Kim et al. |
| 2006/0234742 A1 | 10/2006 | Kim et al. |
| 2006/0240799 A1 | 10/2006 | Kim et al. |
| 2006/0240832 A1 | 10/2006 | Kim et al. |
| 2006/0251100 A1 | 11/2006 | Kim et al. |
| 2006/0259598 A1 | 11/2006 | Kim et al. |
| 2006/0265474 A1 | 11/2006 | Kim et al. |
| 2006/0274697 A1 | 12/2006 | Kim et al. |
| 2007/0005609 A1 | 1/2007 | Breed |
| 2007/0021915 A1 | 1/2007 | Breed et al. |
| 2007/0091846 A1 | 4/2007 | Kim et al. |
| 2008/0096552 A1 | 4/2008 | Won et al. |
| 2008/0219324 A1 | 9/2008 | Park et al. |
| 2009/0017822 A1 | 1/2009 | Kim et al. |

FOREIGN PATENT DOCUMENTS

| | | |
|---|---|---|
| EP | 1469697 | 10/2004 |
| TW | 513581 | 12/2002 |
| TW | 560201 | 11/2003 |
| WO | 2005/025091 | 3/2005 |

OTHER PUBLICATIONS 802.16 IEEE Standard for Local and metropolitan area networks, "Part 16: Air Interface for Fixed Broadband Wireless Access Systems", Jan. 2001, XP-000864171.

* cited by examiner

METHOD OF CONNECTING TO NETWORK IN BROADBAND WIRELESS ACCESS SYSTEM

CROSS REFERENCE TO RELATED APPLICATION

This application is a divisional of application Ser. No. 11/388,870, filed Mar. 24, 2006, now U.S. Pat. No. 7,664,480, which pursuant to 35 U.S.C. §119, claims the benefit of earlier filing date and right of priority to Korean Application No. 10-2005-24698, filed Mar. 24, 2005, and Korean Application No. 10-2005-24701, filed Mar. 24, 2005, the contents all of which are hereby incorporated by reference herein in their entirety.

FIELD OF THE INVENTION

The present invention relates to protocol signaling for network access in a broadband wireless access network, and more particularly, to a management method using primitives to allow a mobile station to connect with a network.

BACKGROUND ART

FIG. 1 depicts an example of a protocol stack architecture. FIG. 2 depicts a flow chart of an exemplary network access procedure during initialization of a mobile station in a broadband wireless access system.

As shown in FIG. 2, when power is initially turned on for a mobile station the downlink channels are searched, then uplink and downlink synchronization with respect to the base station is obtained (S21). The mobile station performs ranging with the base station to adjust uplink transmission parameters, and is allocated a basic management CID and a primary management CID from the base station (S22). Also, negotiation with the base station regarding basic functions is performed (S23). Additionally, authentication with respect to the mobile station is performed (S24), and through registration at the base station, the mobile station being managed by Internet protocol (IP) receives a secondary management CID being allocated from the base station (S25). Thereafter, an IP connection is set (S26), a current date and time are set (S27), a mobile station composition file is downloaded from a TFTP server (S28), and a connection with respect to a previously prepared service is set (S29).

FIG. 3 depicts a flow chart of an exemplary embodiment of a procedure for a mobile station to obtain downlink synchronization. FIG. 4 depicts a flow chart of an exemplary embodiment of a procedure for a mobile station to obtain uplink synchronization. FIGS. 5 and 6 depict flow charts of an exemplary embodiment of a procedure for performing ranging by the mobile station.

FIG. 7 depicts a flow chart of an exemplary embodiment of a procedure for negotiating basic functions performed by a mobile station with a base station. FIG. 8 depicts a flow chart of an exemplary embodiment of an SBC-RSC waiting procedure of a mobile station. FIG. 9 depicts a flow chart of an exemplary embodiment for a registration procedure of a mobile station. FIG. 10 depicts a flow chart of an exemplary embodiment of an REG-RSP waiting procedure of a mobile station.

In the related art, MAC management messages that are sent and received by the mobile station and the base station for network access are defined, but with respect to these messages, the actual operations in a protocol stack layer within the mobile station and the operations in a protocol stack layer within the base station are not defined. Accordingly, if there is a need to provide a separate management system in order to manage the mobile station or the base station, such cannot be achieved.

SUMMARY

One aspect of the present invention involves the recognition by the present inventors of the drawbacks in the related art as explained above. In order to address such problems, the present invention provides a method of defining the primitives between an upper management layer and the MAC layer in order to specify and clarify the operations within the protocol stack layers in a broadband wireless access system to allow a mobile station to perform a method of connecting to a network.

BRIEF DESCRIPTION OF THE DRAWINGS

The accompanying drawings, which are included to provide a further understanding of the invention, are incorporated in and constitute a part of this application, illustrate embodiment(s) of the invention and together with the description serve to explain the principle of the invention. In the drawings.

DETAILED DESCRIPTION

The present invention is described as being implemented in a broadband wireless access system, such as a 802.16e network. However, the present invention may also be adapted and implemented in communication systems operating under other types of communication specifications (e.g., 802.16g, 802.21, 802.11u, etc.), because the concepts and teachings of the present invention could be applied to various communication schemes that operate in a similar manner based upon common techniques. Non-limiting exemplary embodiments of the present invention are explained below with reference to the attached Figures.

Also, certain aspects of the present invention will be described with respect to particular names for the entities, interfaces, primitives, messages, etc., but those skilled in the art will clearly understand that such names are non-limiting, as other names (label, terms, etc.) may also be used as long as their functions correspond with those taught by the present invention.

A feature of the present invention is to provide a method of connecting to a network in a broadband wireless access system, comprising: transmitting, by a mobile station MAC layer, a first primitive for ranging from the management entity; transmitting a CDMA code to the base station during a ranging region on the uplink; receiving a ranging response; transmitting a parameter included in the ranging response or a progress status to the management entity; transmitting a second parameter in order to receive parameters necessary for network access from the management entity; transmitting to the base station, a ranging request message that includes a mobile station MAC address; receiving a ranging response message that includes a management CID; and transmitting to the management entity, the information that was included in the ranging response message.

The above features and advantages will be better understood upon referring to the attached Figures and their related detailed description as follows. Some embodiments of the present invention will be explained in more detail with reference to the attached Figures.

Figure 11:
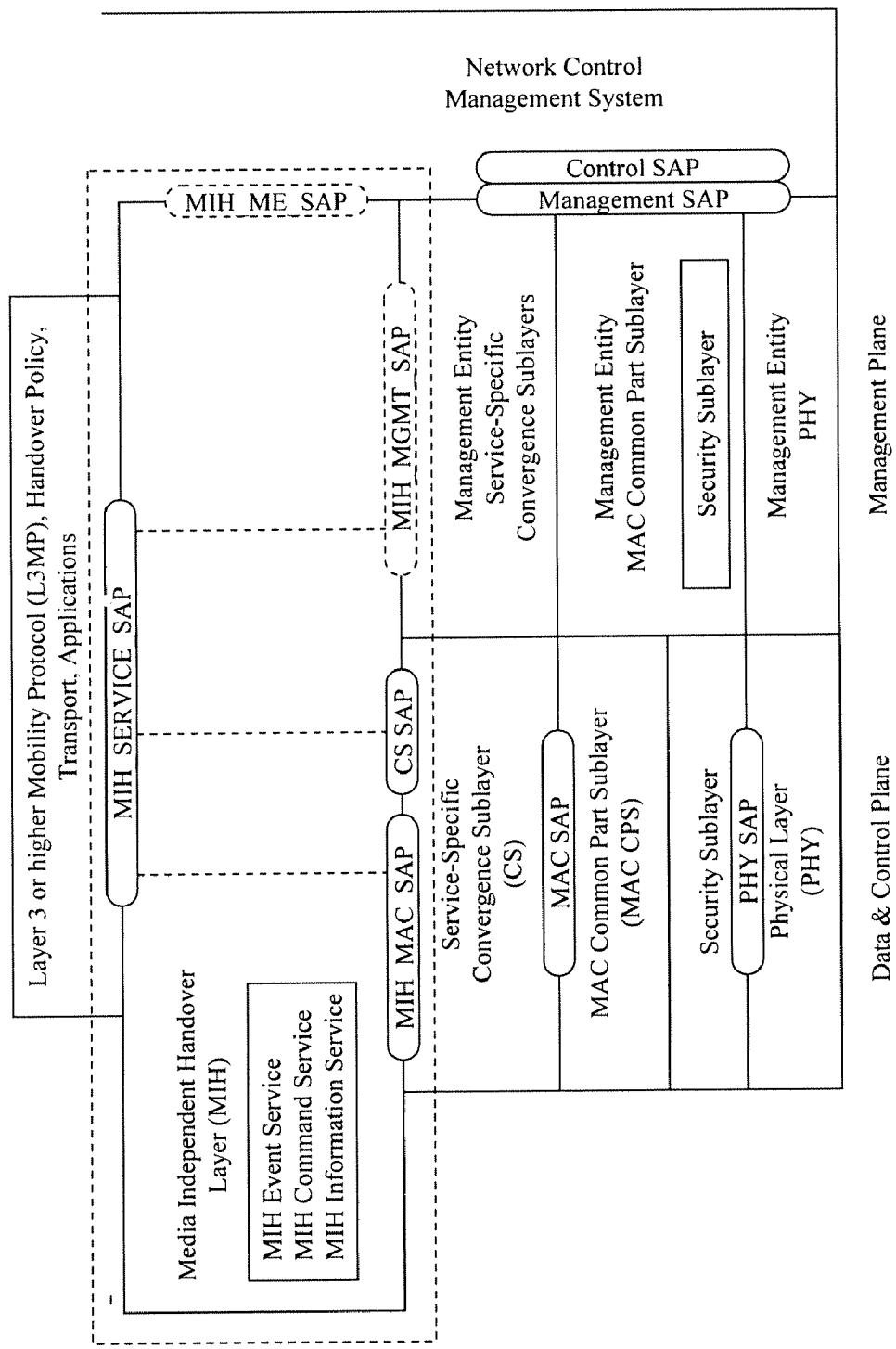
FIG. 11 depicts an exemplary embodiment of a protocol architecture that considers media independent handover (MIH).

FIG. 11 depicts an exemplary embodiment of a protocol architecture that considers media independent handover (MIH).

The primitives proposed by the present invention are delivered, via a management service access point (M-SAP) and/or a control service access point (C-SAP), to a network control and management system (NCMS).

The M-SAP may be used to support system configuration functions, monitoring statistics functions, notifications/triggers functions, and the like. The C-SAP may be used to support handover functions (such as notification of a handover request from a mobile station), idle mode mobility management functions (such as entering idle mode), subscriber and session management functions (such as session establishment requests from the mobile station), radio resource management functions, and the like.

Although the SAPs may be divided in terms of their functions as above, the primitives proposed by the present invention can be delivered through one of two SAPs, or through both. Regarding an effect of the present invention, because the primitives are delivered to the necessary upper layer via the NCMS, the entity that performs management and/or control of the entire system (mobile station or base station) is also allowed to manage the MAC and PHY layers as well.

The entity that performs management according to the present invention may include any entity that interfaces with the NCMS. Examples may include any logical management entity or physical management entity that exists in an IP layer or in its upper layer within a device (e.g., mobile station, base station, etc.). The operation of the present invention may look as if the NCMS directly sends (delivers) the primitives, because communication is performed from the upper management entity, via the NCMS, to the Management SAP (M-SAP) or Control SAP (C-SAP).

Figure 1:
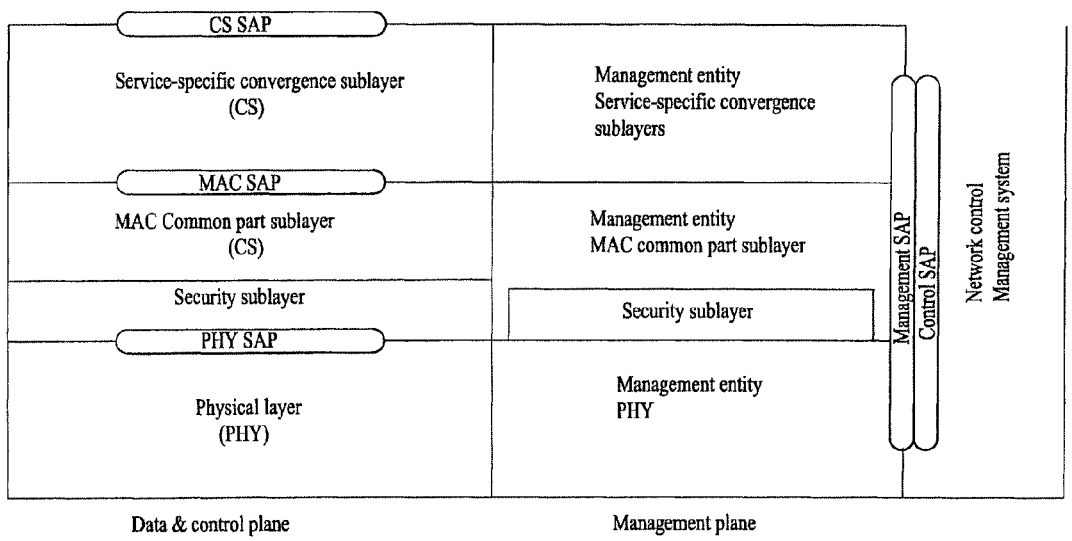
FIG. 1 depicts an example of a protocol stack architecture.
Figure 2:
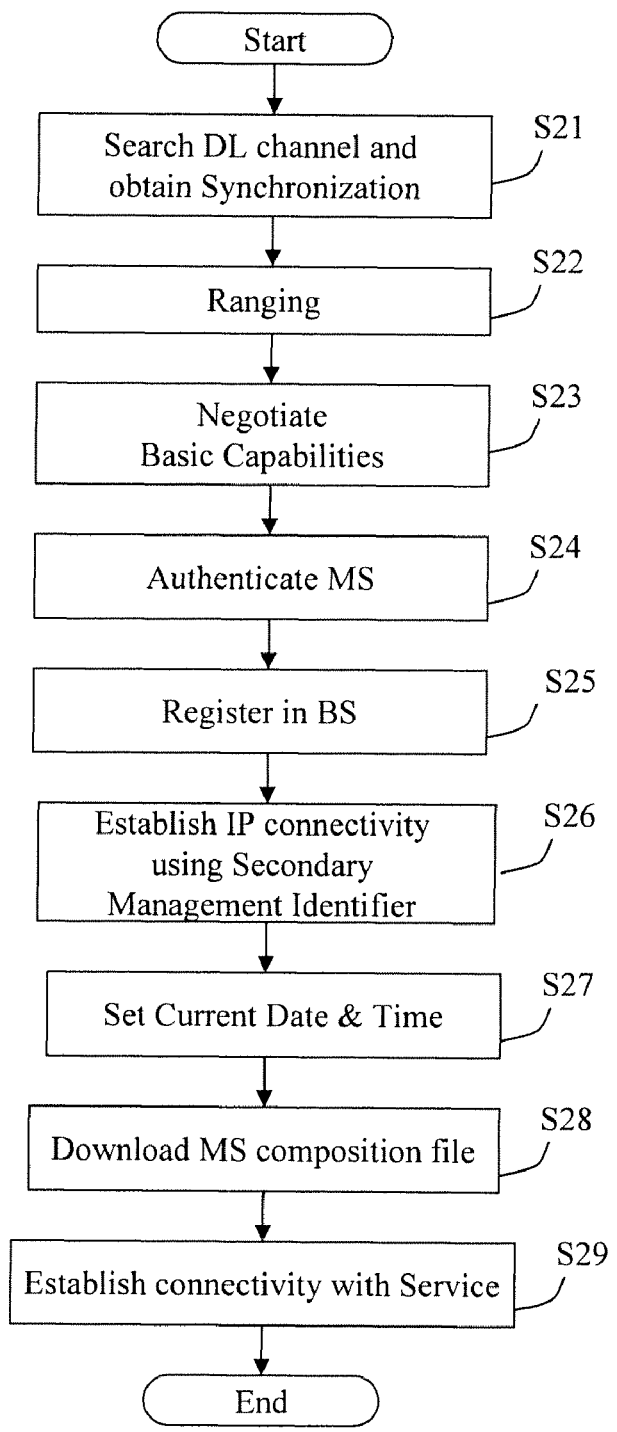
FIG. 2 depicts a flow chart of an exemplary network access procedure during initialization of a mobile station in a broadband wireless access system.
Figure 3:
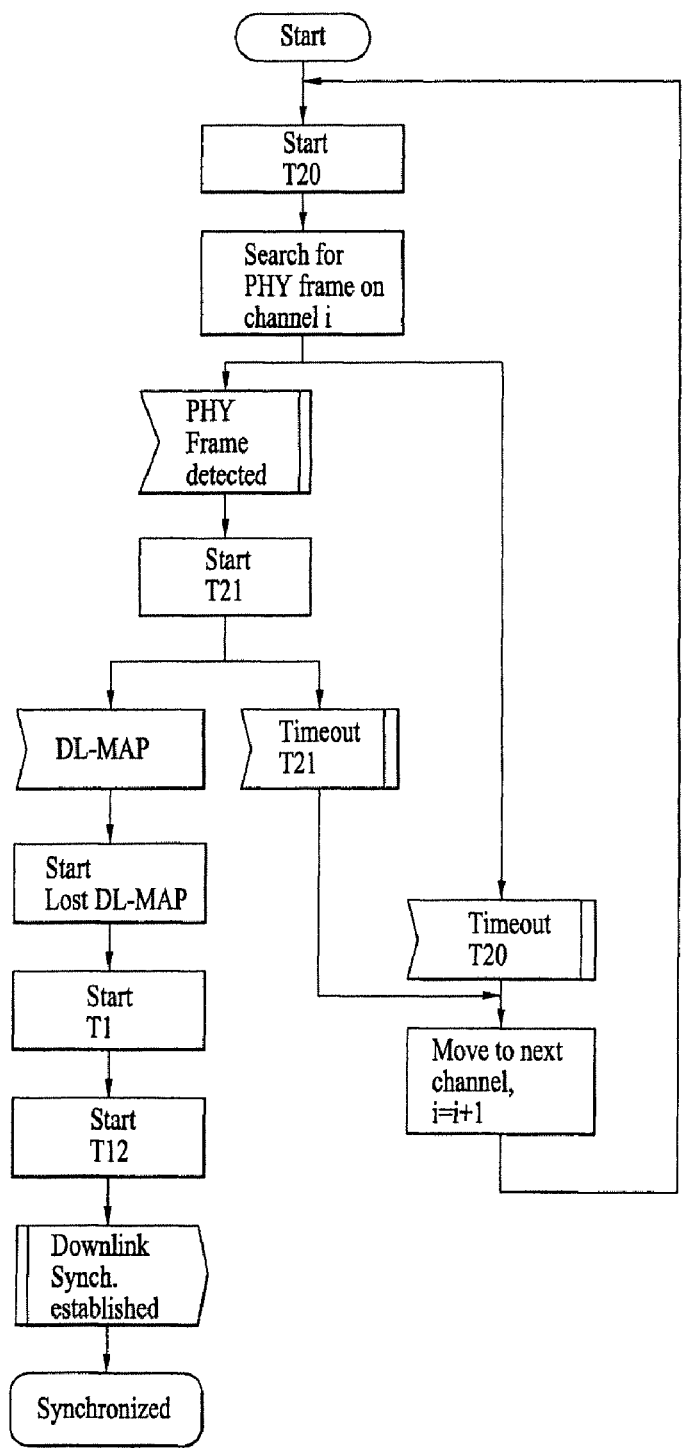
FIG. 3 depicts a flow chart of an exemplary embodiment of a procedure for a mobile station to obtain downlink synchronization.
Figure 4:
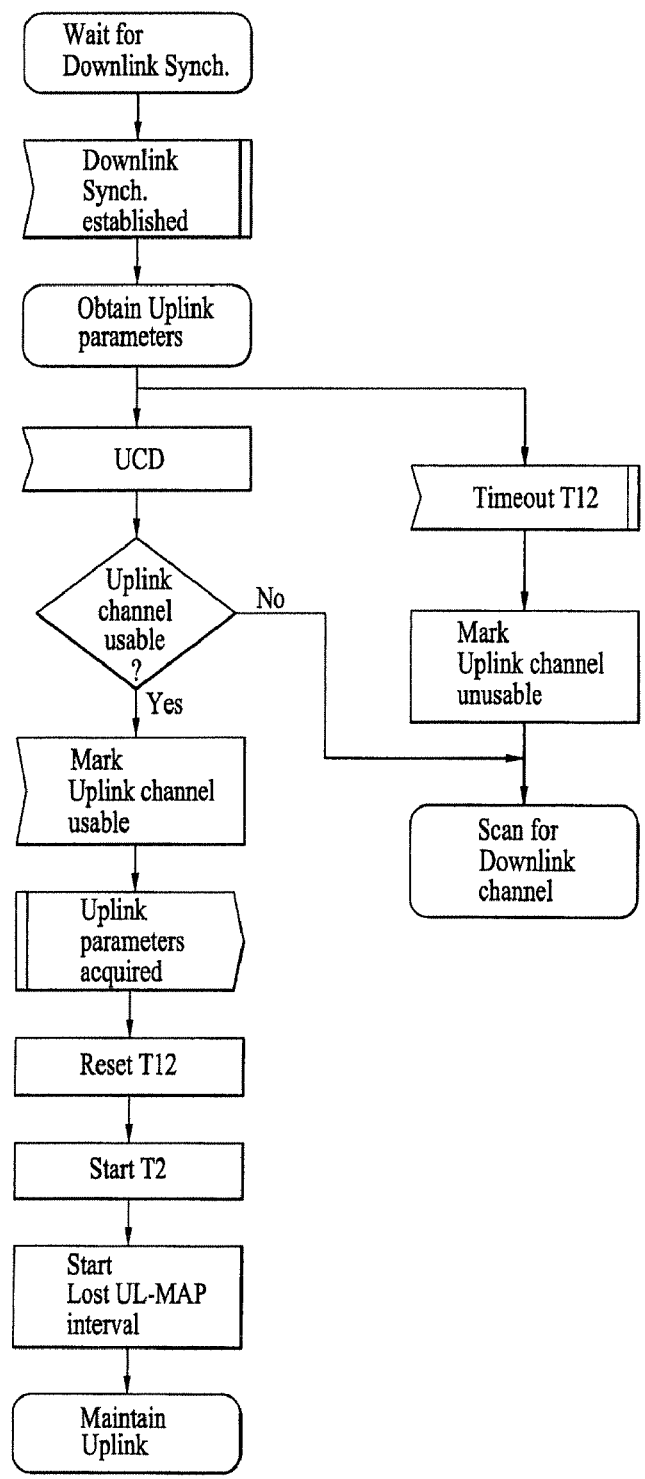
FIG. 4 depicts a flow chart of an exemplary embodiment of a procedure for a mobile station to obtain uplink synchronization.
Figure 5:
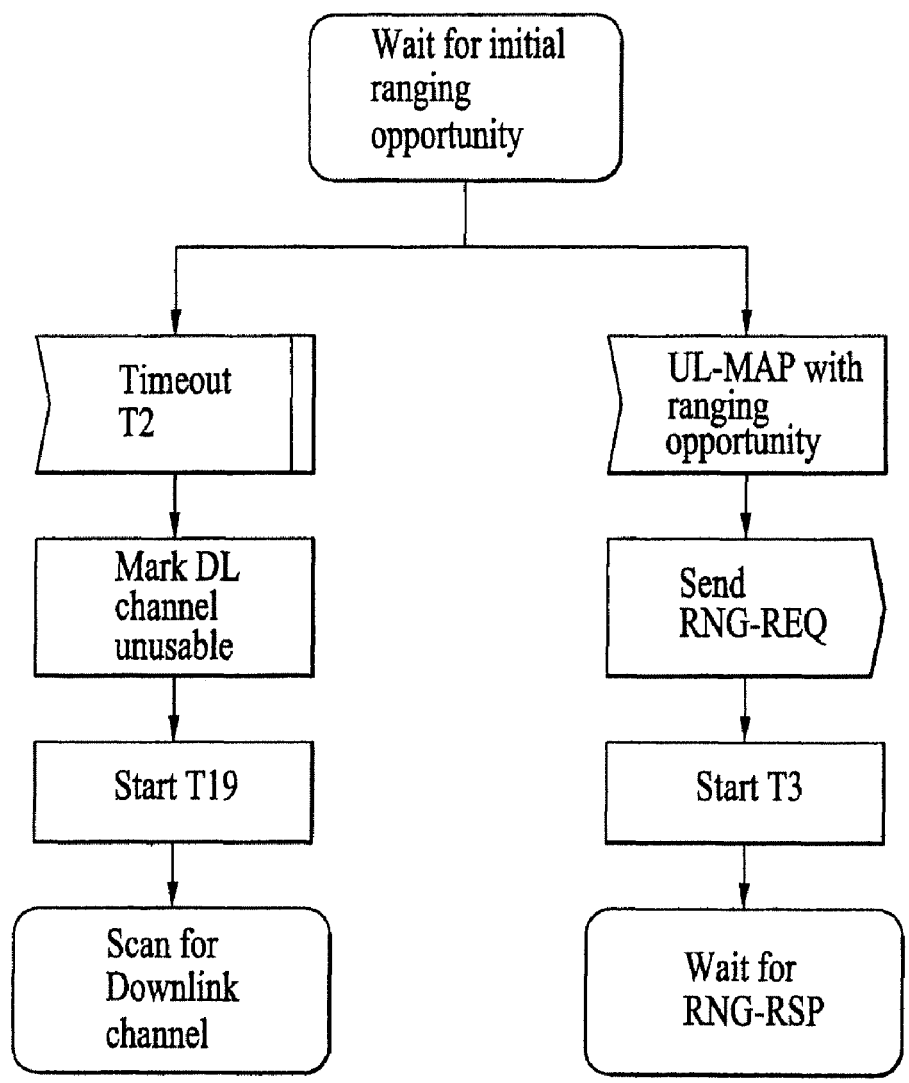
FIG. 5 depicts a flow chart of an exemplary embodiment of a procedure for performing ranging by the mobile station.
Figure 6:
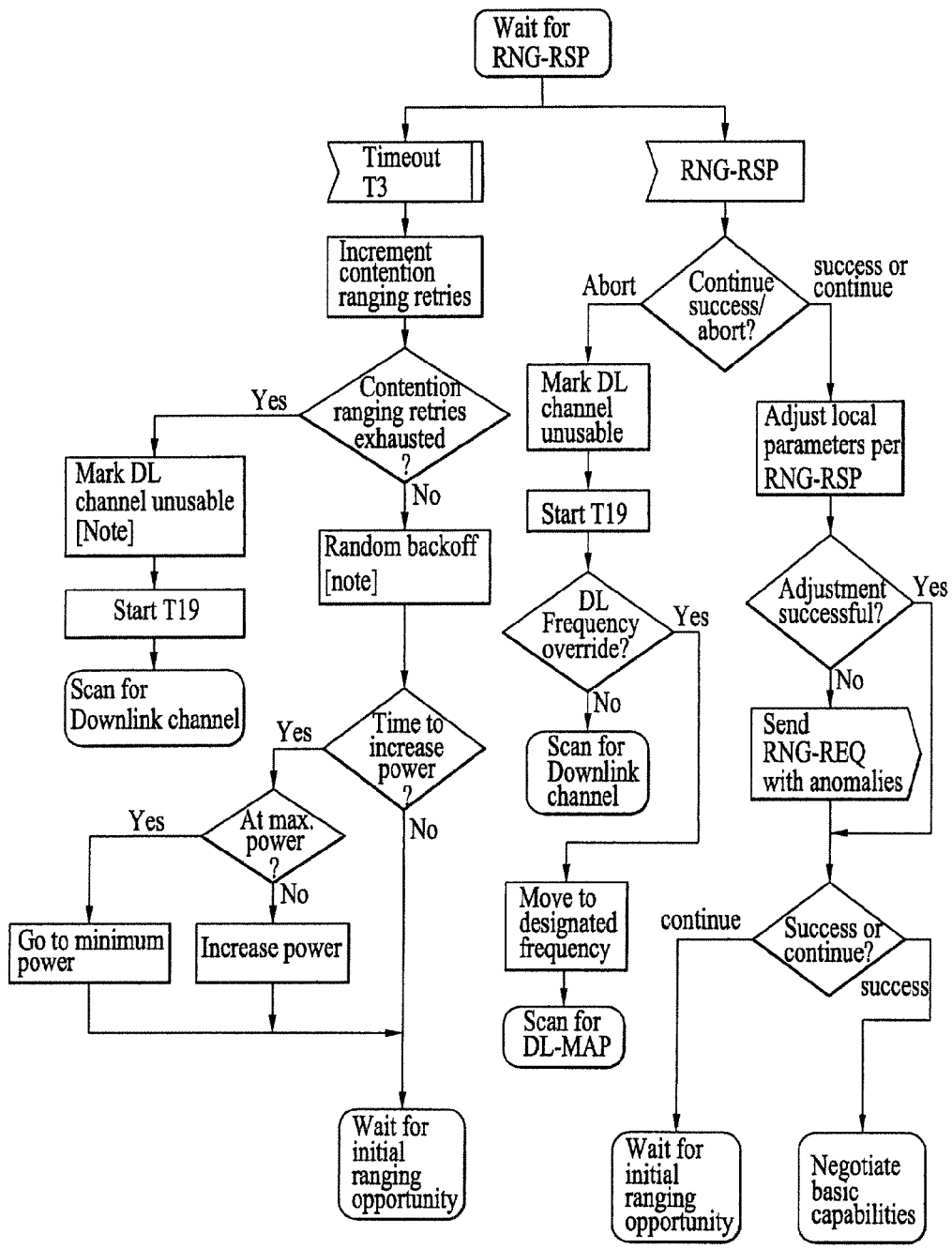
FIG. 6 depicts a flow chart of an exemplary embodiment of a procedure for performing ranging by the mobile station.
Figure 7:
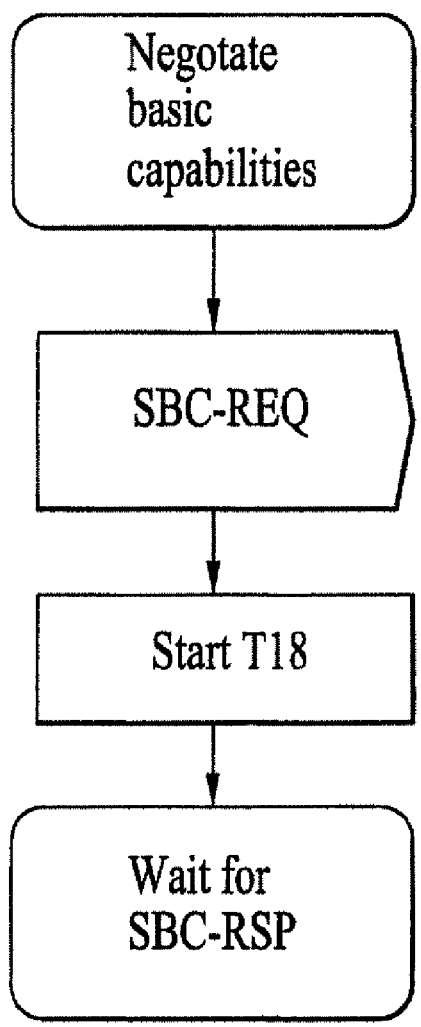
FIG. 7 depicts a flow chart of an exemplary embodiment of a procedure for negotiating basic functions performed by a mobile station with a base station.
Figure 8:
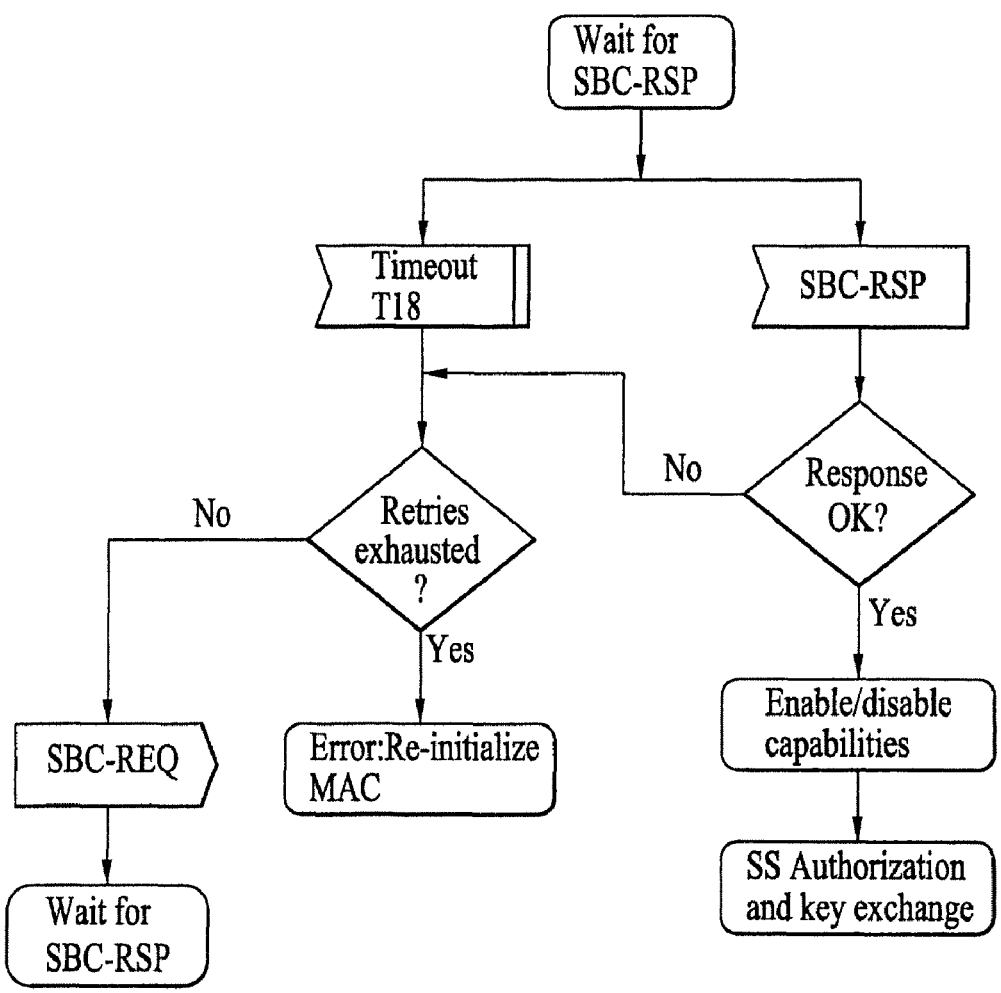
FIG. 8 depicts a flow chart of an exemplary embodiment of an SBC-RSC waiting procedure of a mobile station.
Figure 9:
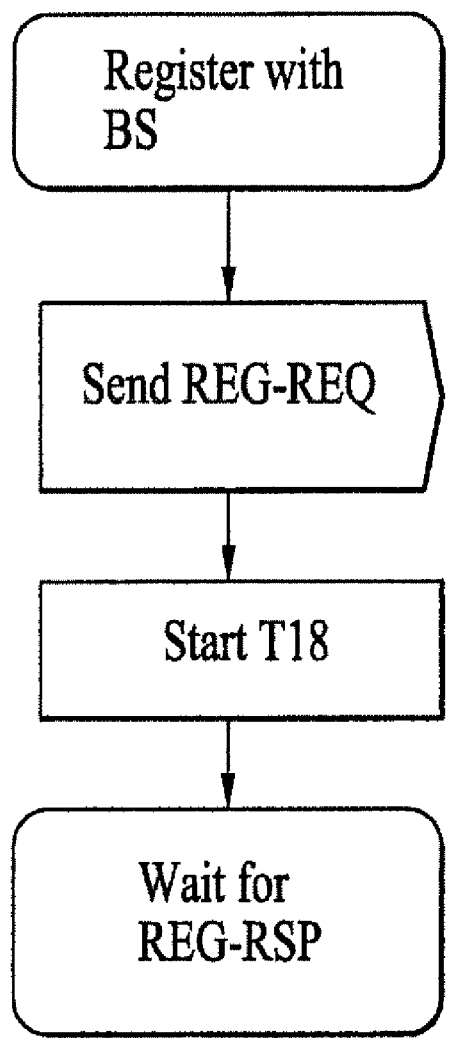
FIG. 9 depicts a flow chart of an exemplary embodiment for a registration procedure of a mobile station.
Figure 10:
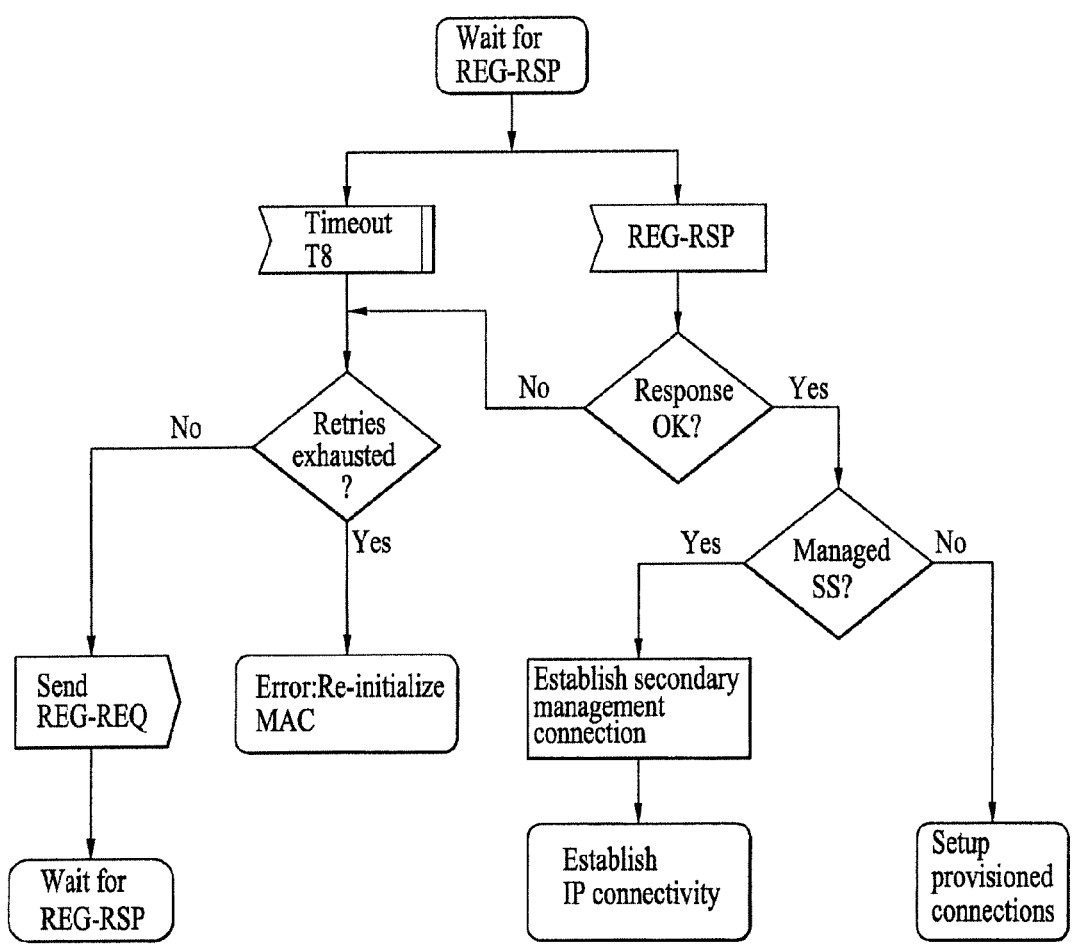
FIG. 10 depicts a flow chart of an exemplary embodiment of an REG-RSP waiting procedure of a mobile station.

The upper management entity used in the present invention can be located above a layer management entity within a protocol stack as shown in FIG. 1, and be divided into a physical or logical upper management entity that communicates through the NCMS or management SAP of a layer management entity. The upper management entity may exist within a particular protocol stack or may exist as a separate and independent system or stack, but will be conceptually referred to as an upper management entity.

Figure 12:
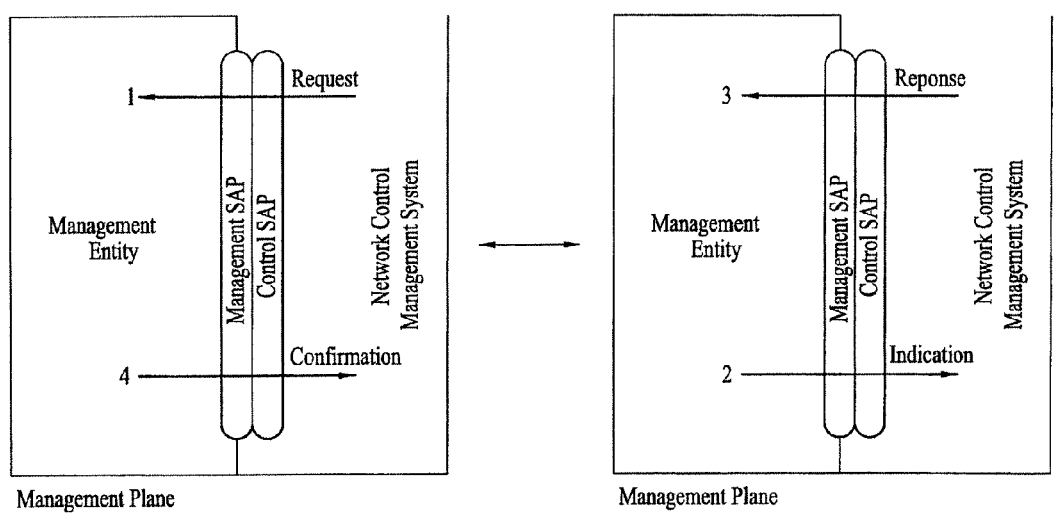
FIG. 12 depicts an exemplary embodiment showing the operation when cooperation with a remote entity is necessary.
Figure 13:
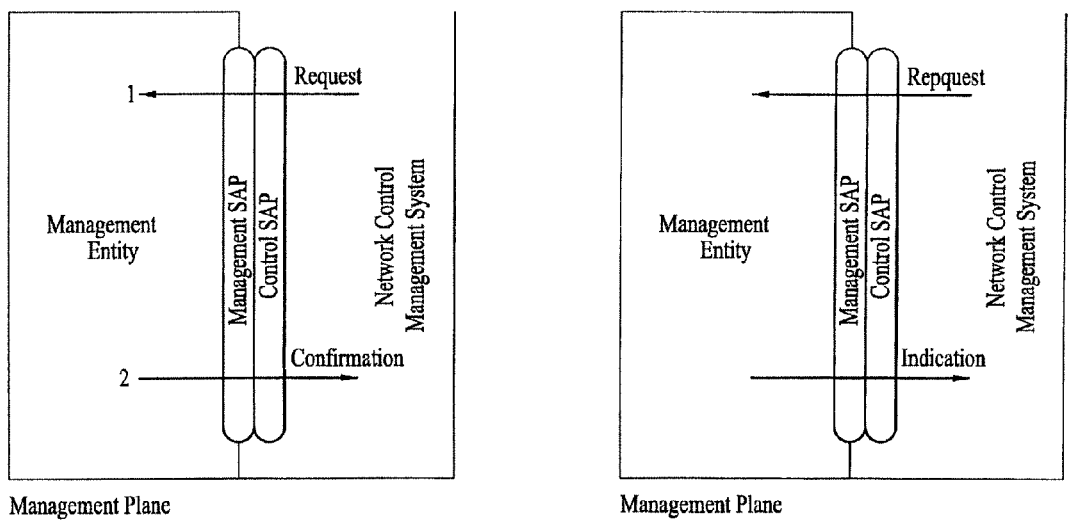
FIG. 13 depicts an exemplary embodiment showing primitives being delivered only within local entities.

FIG. 12 depicts an exemplary embodiment showing the operation when cooperation with a remote entity is necessary. FIG. 13 depicts an exemplary embodiment showing primitives being delivered only within local entities.

As shown in FIG. 12, when there is cooperation with a remote entity, a pair of primitives comprising a Request/Confirmation or comprising a Response/indication are delivered.

As shown in FIG. 13, when operations occur within a local stack, there may be two situations: mutual exchanges between the management entity and the NCMS (i.e., a bi-directional operation) or a uni-directional operation. For bi-directional operation, the delivery from the management entity through the M-SAP/C-SAP to the NCMS is called a Request, and its response that is transmitted is called an Indication. For uni-directional operation, the delivery from the management entity through the M-SAP/C-SAP to the NCMS is called a Request, and a uni-directional delivery in the opposite direction is called an Indication.

The primitives according to the present invention may be used for a multi-mode mobile station in which a management entity instructs a corresponding mode or when the corresponding mode delivers information to the entity that manages all the multi-modes. In such case, the following two situations can exist.

First, when the primitives are delivered from the MIH layer or MIH function to a lower layer, the MIH (layer or function) may interpret the information (e.g., commands, etc.) received from an upper layer when delivering the corresponding primitive or the upper layer information (command) may be mapped with the commands of the present invention and transmitted.

Second, when the primitives are delivered from the lower layer to the MIH layer or MIH function, the MIH (layer or function) may interpret the primitive received from the lower layer when transmitting the corresponding primitive (i.e., a unified primitive defined at the MIH) to be delivered to the upper layer or the primitive of the lower layer and the primitive to be sent to the upper layer may be simply mapped and then transmitted.

When used in Media Independent Handover (MIH), the primitives defined by the present invention may be delivered through the SAP between the NCMS and the MIH or the SAP between the management entity and the MIH such that MIH techniques can be achieved.

Hereafter, some examples of the primitives proposed by the present invention are explained. Only some parameters of the primitives explained herein are provided merely as non-limiting examples. If the contents of the parameters delivered to the MAC need to be delivered to the management entity, additional parameters not specified in this description may also be included. The contents of the parameters that are delivered to the MAC, as well as other necessary parameters, may be delivered in TLV (Type-Length-Value) format.

1. M_Ranging.request (1) Function

This primitive has the function of requesting ranging to be performed. The management entity uses this primitive to request that ranging be performed.

(2) Semantics

M_Ranging.request (
  Source,
  Destination,
  Ranging Type
)

TABLE 1

| Name | Type | Valid Range | Description |
|---|---|---|---|
| Source | | | Start point of Request |
| Destination | | | Target point to which Request is delivered |
| Ranging Type | Enumeration | Initial Handoff Location Update Periodic | Types of Ranging |

(3) Time of Formation

The upper entity forms this primitive for initial network access, after handover is performed, for a mobile station in idle mode to perform location update, for attempting network access from idle mode, or when periodic ranging is necessary.

(4) Effect when Received

Upon receiving this primitive, the necessary corresponding TLV (Type-Length-Value) according to the Ranging Type is included and a RNG-REQ MAC management message or a ranging CDMA code is transmitted via the air interface to performing ranging.

2. M_Ranging.indication (1) Function

This primitive informs the upper management entity that a particular mobile station has requested ranging via reception of a MAC management message.

(2) Semantics

M_Ranging.indication (
  Source,
  Destinaiton,
  MS Address,
  CDMA Code,
  MAC Version,
  Required Downlink Burst Profile,
  Serving BS ID,
  Target BS ID,
  HO Indication,
  Location Update Request,
  Paging Controller ID
)

TABLE 2

| Name | Type | Valid Range | Description |
|---|---|---|---|
| Source | | | Start point of Indication |
| Destination | | | Target point to which Indication is delivered |
| MAC Address | MAC Address | Any valid individual MAC address | MAC address of MS that requested ranging |
| CDMA Code | | | CDMA Code value that MS transmitted for Ranging |
| MAC Version | Enumeration | IEEE Std 802.16-2001 IEEE Std 802.16c-2002 and its predecessors IEEE Std 802.16a-2003 and its predecessors IEEE Std 802.16-2004 | Version of MAC the MS supports |
| Required Downlink Burst Profile | | | DIUC value of requested Downlink Burst Profile |
| Serving BS ID | | | When performing HO or Location update in Idle mode or Network entry from Idle mode, the ID of Serving BS when Ranging is performed at Target BS |
| Target BS ID | | | When performing HO or Location update in Idle mode or Network entry from Idle mode, the ID of Target BS when Ranging is performed at Target BS |
| HO Indication | | | Indicator to inform that ranging is being performed by MS while performing handover |

TABLE 2-continued

| Name | Type | Valid Range | Description |
|---|---|---|---|
| Location Update Request | | | Indicator to inform that ranging is for Idle mode Location Update performed by MS |
| Paging Controller ID | | | ID of Paging Controller that manages Idle mode Location Update or Network Entry |

(3) Time of Formation
Formed when the MAC layer receives a RNG-REQ, a MAC management message or a Ranging Code via the air interface.
(4) Effect when Received
The received ranging request is analyzed and a M_ranging.response used to reply to the ranging is formed.
3. M_Ranging.response
(1) Function
A function to inform about a result of ranging request.
(2) Semantics

```
M_Ranging.response (
Source,
Destination,
MS Address,
Result Code,
Management CIDs,
Resource Retain Flag,
HO Process Optimization,
Location Update Response,
Paging Information,
Paging Controller ID,
Next Periodic Ranging
)
```

(3) Time of Formation
Formed after receiving M_Ranging.indication at a time determined when its results are to be informed.
(4) Effect when Received
The MAC layer transmits, through the primitives, MAC management message and RNG-RSP that includes parameters received.
4. M_Ranging.confirmation
(1) Function
A primitive to inform a result contained in a response message of ranging to an upper management entity.
(2) Semantics

```
M_Ranging.confirmation (
Source,
Destination,
MS Address,
Result Code,
Management CIDs,
Resource Retain Flag,
HO Process Optimization,
Location Update Response,
Paging Information,
Paging Controller ID
Next Periodic Ranging
)
```

TABLE 3

| Name | Type | Valid Range | Description |
|---|---|---|---|
| Source | | | Start point of Indication |
| Destination | | | Target point to which Indication is delivered |
| MAC Address | MAC Address | Any valid individual MAC address | MAC address of MS that requested ranging |
| Result Code | Enumeration | Continue Success | Result of processing ranging request |
| Management CIDs | Enumeration | Basic CID Primary Management CID | If successful ranging request, Management CIDs allocated to the MS |
| Resource Retain Flag | | | Informs whether MS information is maintained in previous BS as a result of HO |
| HO Process Optimization | | | Informs about procedures that may be omitted upon network entry after HO |
| Location Update Response | Enumeration | Failure Success | Informs about location update results of idle mode |
| Paging Information | | | Parameter to inform about Paging Period and Offset if Location Update is successful, and Paging Group ID |
| Paging Controller ID | | | ID of entity that manages Idle Mode |
| Next Periodic Ranging | | | Frame offset the informs about when next periodic ranging occurs, if in sleep mode |

TABLE 4

| Name | Type | Valid Range | Description |
|---|---|---|---|
| Source | | | Start point of Confirmation |
| Destination | | | Target point to which Confirmation is delivered |
| MAC Address | MAC Address | Any valid individual MAC address | MAC address of MS that requested ranging |
| Result Code | Enumeration | Continue Success | Result of processing ranging request |
| Management CIDs | Enumeration | Basic CID Primary Management CID | If successful ranging request, Management CIDs allocated to the MS |
| Resource Retain Flag | | | Informs whether MS information is maintained in previous BS as a result of HO |
| HO Process Optimization | | | Informs about procedures that may be omitted upon network entry after HO |
| Location Update Response | Enumeration | Failure Success | Informs about location update results of idle mode |
| Paging Information | | | Parameter to inform about Paging Period and Offset if Location Update is successful, and Paging Group ID |
| Paging Controller ID | | | ID of entity that manages Idle Mode |
| Next Periodic Ranging | | | Frame offset the informs about when next periodic ranging occurs, if in sleep mode |

(3) Time of Formation

Formed when MAC layer receives RNG-RSP via the air interface.

(4) Effect when Received

The management entity receives a report about the results of performing ranging.

5. M_Registration.request (1) Function

This primitive has the function of requesting registration. The management entity uses this primitive to request registration.

(2) Semantics

```
M_Registration.request (
Source,
Destination,
    IP Management Mode
IP Version,
Method of Allocating IP Address,
Previous IP Address
)
```

TABLE 5

| Name | Type | Valid Range | Description |
|---|---|---|---|
| Source | | | Start point of Request |
| Destination | | | Target point to which Request is delivered |
| IP Management | Enumeration | Unmanaged mode Managed mode | Whether MS should be managed by IP |
| IP Version | Enumeration | Version 4 Version 6 | Version of IP |

TABLE 5-continued

| Name | Type | Valid Range | Description |
|---|---|---|---|
| Method of Allocating IP Address | Enumeration | DHCP Mobile IPv4 DHCPv6 IPv6 Stateless Address Autoconfiguration | Method of setting IP address of MS |
| Previous IP Address | IP Address | | MS address that was allocated from previous BS |

(3) Time of Formation

Formed to instruct the management entity to perform registration, when all pre-processing procedures for registration have been completed, among network access procedures.

(4) Effect when Received

Upon receiving the above command, the necessary corresponding TLV (Type-Length-Value) is added and a REG-REQ MAC management message is transmitted via the air interface.

6. M_Registration.indication (1) Function

This primitive informs about the reception of a registration request made to the upper management entity through a MAC management message.

(2) Semantics

```
M_Registration.indication (
Source,
Destination,
    IP Management Mode
```

-continued

```
IP Version,
Method of Allocating IP Address,
Previous IP Address
)
```

TABLE 6

| Name | Type | Valid Range | Description |
|---|---|---|---|
| Source | | | Start point of Indication |
| Destination | | | Target point to which Indication is delivered |
| IP Management | Enumeration | Unmanaged mode Managed mode | Whether MS should be managed by IP |
| IP Version | Enumeration | Version 4 Version 6 | Version of IP |
| Method of Allocating IP Address | Enumeration | DHCP Mobile IPv4 DHCPv6 IPv6 Stateless Address Autoconfiguration | Method of setting IP address of MS |
| Previous IP Address | IP Address | | MS address that was allocated from previous BS |

(3) Time of Formation

Formed when MAC layer receives REG-REQ via the air interface.

(4) Effect when Received

The parameters if the received registration are analyzed, and an M_Registration.response is formed in response to the registration.

7. M_Registration.repsonse (1) Function

This primitive has the function of informing a result of a Registration Request.

(2) Semantics

```
M_Registration.response (
Source,
Destination,
    IP Management Mode
IP Version,
Method of Allocating IP Address,
Skip Address Acquisition
)
```

TABLE 7

| Name | Type | Valid Range | Description |
|---|---|---|---|
| Source | | | Start point of Indication |
| Destination | | | Target point to which Indication is delivered |
| IP Management | Enumeration | Unmanaged mode Managed mode | Whether MS should be managed by IP |
| IP Version | Enumeration | Version 4 Version 6 | Version of IP |
| Method of Allocating IP Address | Enumeration | DHCP Mobile IPv4 DHCPv6 IPv6 Stateless Address Autoconfiguration | Method of setting IP address of MS |

TABLE 7-continued

| Name | Type | Valid Range | Description |
|---|---|---|---|
| Skip Address Acquisition | Enumeration | No IP address Change Re-acquire IP address | Whether MS needs to re-establish IP address |

(3) Time of Formation

Formed after receiving M_Registration.indication at a time determined when its results are to be informed.

(4) Effect when Received

The MAC layer transmits, through the primitives, MAC management message and REG-RSP that includes parameters received.

8. M_Ranging.confirmation (1) Function

This primitive informs the results contained in the response message of the registration sent to the upper management entity.

(2) Semantics

```
M_Registration.confirmation (
Source,
Destination,
IP management Mode
IP Version,
Method of Allocating IP Address,
Skip Address Acquisition
)
```

TABLE 8

| Name | Type | Valid Range | Description |
|---|---|---|---|
| Source | | | Start point of Confirmation |
| Destination | | | Target point to which Confirmation is delivered |
| IP Management | Enumeration | Unmanaged mode Managed mode | Whether MS should be managed by IP |
| IP Version | Enumeration | Version 4 Version 6 | Version of IP |
| Method of Allocating IP Address | Enumeration | DHCP Mobile IPv4 DHCPv6 IPv6 Stateless Address Autoconfiguration | Method of setting IP address of MS |
| Skip Address Acquisition | Enumeration | No IP address Change Re-acquire IP address | Whether MS needs to re-establish IP address |

(3) Time of Formation

Formed when MAC layer receives REG-RSP via the air interface.

(4) Effect when Received

The upper management entity receives a report about the results of performing registration.

9. M_Basic_Capability_Nego.request (1) Function

A function of allowing the upper management entity to request the MAC layer to being procedures to negotiate with the base station, the basic capabilities of the mobile station.

(2) Semantics

```
M_Basic_Capability_Nego.request  (
    Source,
    Destination,
        Authorization Policy Support
)
```

TABLE 9

| Name | Type | Valid Range | Description |
|---|---|---|---|
| Source | | | Start point of Request |
| Destination | | | Target point to which Request is delivered |
| Authorization Policy Support | Enumeration | X.509 digital certificates and the RSA public key encryption algorithm EAP | |

(3) Time of Formation

Formed when the pre-processing procedures for negotiating mobile station basic capabilities with the base station, among the network access procedures, are completed.

(4) Effect when Received

Upon receiving this command, corresponding TLVs needed for negotiation are inserted and a SBC-REQ MAC management message is transmitted over the air interface.

10. M_Basic_Capability_Nego.indication (1) Function

This primitive informs to an upper management entity that a request for basic capability negotiation of a mobile station has been received through a MAC management message.

(2) Semantics

```
M_Basic_Capability_Nego.indication  (
    Source,
    Destination,
        Parameters in SBC-REQ
)
```

TABLE 10

| Name | Type | Valid Range | Description |
|---|---|---|---|
| Source | | | Start point of Indication |
| Destination | | | Target point to which Indication is delivered |
| Authorization Policy Support | Enumeration | X.509 digital certificates and the RSA public key encryption algorithm EAP | |
| TLV parameters | | | The TLVs in SBC-REQ may be expressed |

(3) Time of Formation

Formed when MAC layer receives SBC-REQ via the air interface.

(4) Effect when Received

The received parameters are analyzed and as a response thereto, an M_Basic_Capability_Nego.response containing available parameters is formed.

11. M_Basic_Capability_Nego.response (1) Function

A function to inform about the capabilities that can be supported among the basic capabilities that the upper management entity received, namely, a function for informing the negotiation results.

(2) Semantics

```
M_Basic_Capability_Nego.response (
    Source,
    Destination,
    Parameters among those in the
    M_Basic_Capability_Nego.indication that can be supported
)
```

TABLE 11

| Name | Type | Valid Range | Description |
|---|---|---|---|
| Source | | | Start point of Response |
| Destination | | | Target point to which Response is delivered |
| Authorization Policy Support | Enumeration | X.509 digital certificates and the RSA public key encryption algorithm EAP | |
| TLV parameters | | | The TLVs in SBC-REQ may be expressed |

(3) Time of Formation

Formed when the results of determining which basic capabilities the base station may support among those included in the M_Basic_Capability_Nego.indication that is received can be informed.

(4) Effect when Received

The MAC layer transmits an SBC-RSP (MAC message) that includes, in TLV format, the parameters received through this primitive.

12. M_Basic_Capability_Nego.confirmation (1) Function

This primitive has the function to inform the upper management entity about the negotiation results of the basic capabilities known from the SBC-RSP.

(2) Semantics

```
M_Basic_Capability_Nego.confirmation  (
    Source,
    Destination,
        Parameters contained in SBC-RSP
)
```

TABLE 12

| Name | Type | Valid Range | Description |
|---|---|---|---|
| Source | | | Start point of Confirmation |
| Destination | | | Target point to which Confirmation is delivered |
| Authorization Policy Support | Enumeration | X.509 digital certificates and the RSA public key encryption algorithm EAP | |
| TLV parameters | | | The TLVs in SBC-RSP may be expressed |

(3) Time of Formation

When MAC layer receives SBC-RSP via the air interface.

(4) Effect when Received

The upper management entity is reported the basic capability negotiation results.

13. M_Authenticate.request (1) Function

A function to allow the mobile station to begin authentication procedures for network access.

(2) Semantics

```
M_Authenticate.request   (
    Source,
    Destination,
    PKM version,
    Authenticate Protocol
)
```

TABLE 13

| Name | Type | Valid Range | Description |
|---|---|---|---|
| Source | | | Start point of Request |
| Destination | | | Target point to which Request is delivered |
| PKM Version | Enumeration | Version 1 Version 2 | |
| Authenticate Protocol | Enumeration | RSA EAP | |

(3) Time of Formation

When authentication of the base station is received to allow message transmission and reception, after receiving the basic radio setting procedures and CIDs for management.

(4) Effect when Received

A PKM-REQ MAC management message is transmitted over the air interface upon including the corresponding TLVs needed for authentication.

14. M_Authenticate.indication (1) Function

This primitive informs the upper management entity that a mobile station authentication request had been received through a MAC management message. The termination point of this message can be the upper management entity or an authentication server via such entity.

(2) Semantics

```
M_Authenticate.indication   (
    Source,
    Destination,
    Code
    PKM Identifier
MS certificate
    Security Capability
    SAID
)
```

TABLE 14

| Name | Type | Valid Range | Description |
|---|---|---|---|
| Source | | | Start point of Indication |
| Destination | | | Target point to which Indication is delivered |
| Code | Enumeration | SA Add Auth Request Auth Reply Auth Reject Key Request Key Reply Key Reject Auth Invalid TEK Invalid Auth Info EAP-transfer EAP Establish-Key Request EAP Establish-Key Reply EAP Establish-Key Reject EAP Establish-Key Confirm Pre-Auth-Request Pre-Auth-Reply Pre-Auth-Reject | |
| PKM Identifier | | | Used to find corresponding response of BS with respect to MS request. MS increases this value by "1" for a 256 value cycle whenever a "new" PKM message is transmitted. |

TABLE 14-continued

| Name | Type | Valid Range | Description |
|---|---|---|---|
| MS Certificate | | | Includes the X.509 user certificate of MS |
| Security Capabilities | | | Defines security association of requesting MS |
| SAID | | | Primary SAID such as Basic CID of MS |

(3) Time of Formation

When MAC layer receives PKM-REQ via the air interface.

(4) Effect when Received

Forms M_Authenticate.response after performing necessary procedures upon analyzing parameter values of the received primitive.

15. M_Authenticate.response (1) Function

To inform the base station processing results with respect to an authentication request, the upper management entity reports the processing results to the MAC layer, and this primitive allows this result to be transmitted to the mobile station.

(2) Semantics

```
M_Authenticate.response  (
    Source,
    Destination,
    Code
        PKM Identifier
        AUTH-Key
    Key-Lifetime
    Key-Sequence-Number
    SA-Descriptors
    )
```

TABLE 15

| Name | Type | Valid Range | Description |
|---|---|---|---|
| Source | | | Start point of Response |
| Destination | | | Target point to which Response is delivered |
| Code | Enumeration | SA Add<br>Auth Request<br>Auth Reply<br>Auth Reject<br>Key Request<br>Key Reply<br>Key Reject<br>Auth Invalid<br>TEK Invalid<br>Auth Info<br>EAP-transfer<br>EAP Establish-Key Request<br>EAP Establish-Key Reply<br>EAP Establish-Key Reject<br>EAP Establish-Key Confirm<br>Pre-Auth-Request<br>Pre-Auth-Reply<br>Pre-Auth-Reject | |
| PKM Identifier | | | Used to find corresponding response of BS with respect to MS request. MS increases this value by "1" for a 256 value cycle whenever a "new" PKM message is transmitted. |
| AUTH-Key | | | Authorization (AUTH) key, encrypted with the target client PSS's public key |
| Key-Lifetime | | | AK's active lifetime |
| Key-Sequence-Number | | | AK's sequence number |
| SA Descriptors | | | Each compound SA-Descriptor attribute specifies a SAID and additional properties of the SA |

(3) Time of Formation

Formed when the information about authentication should be given to the mobile station, after receiving the M_Authenticate.indication and its processing is complete.

(4) Effect when Received the MAC layer transmits a MAC management message, PKM-RSP including the parameters received through the primitive.

16. M_Authenticate.confirmation (1) Function

This primitive has the function of informing the results of authentication and the parameter to the upper management entity.

(2) Semantics

```
M_Authenticate.confirmation (
    Source,
    Destination,
    Code
        PKM Identifier
        AUTH-Key
    Key-Lifetime
    Key-Sequence-Number
    SA-Descriptors
    )
```

(3) Time of Formation

Formed when MAC layer receives PKM-RSP via the air interface.

(4) Effect when Received

The upper management entity receives the reported authentication results and updates the parameters for operations related to later authentication. A key for communication may be additionally received.

Figure 14:
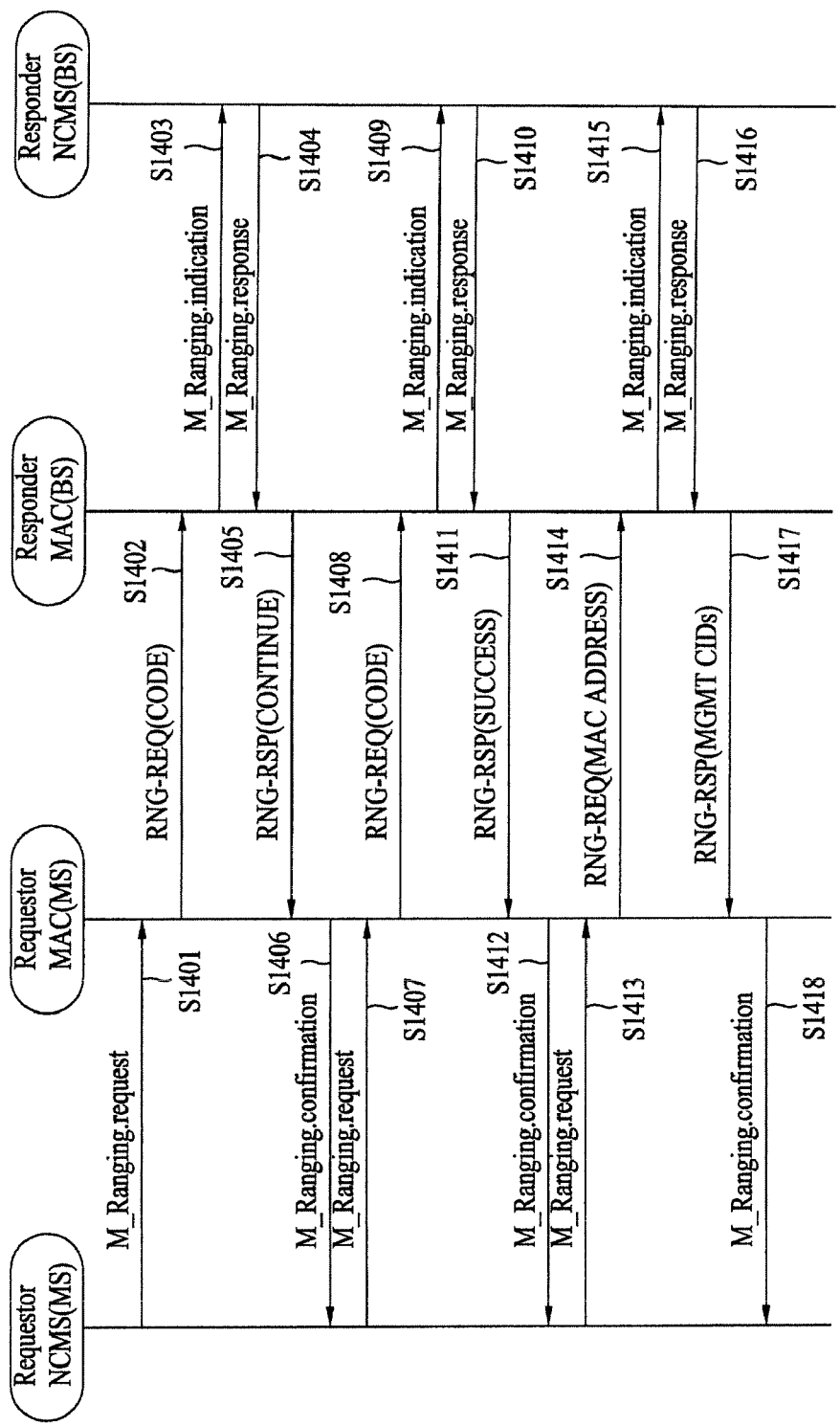
FIG. 14 depicts a flow chart of an exemplary embodiment of a ranging procedure for network access.

FIG. 14 depicts a flow chart of an exemplary embodiment of a ranging procedure for network access. Referring to FIG. 14, the upper management entity transmits primitives to the MAC layer via the NCMS (Network Control and Management System) to allow the mobile station to perform ranging (S1401). Here, the upper management entity informs about the kind of ranging to be performed by means of a ranging type in the primitive to allow the mobile station to determine various factors, such as the TLV values it must include.

In this embodiment, the ranging refers to the initial ranging for network access in Orthogonal Frequency Division Multiplex Access (OFDMA), whereby CDMA codes are transmitted in a competing (contending) manner in the ranging region of the uplink (S1402).

Upon receiving the ranging CDMA code, the base station MAC layer includes radio signal information and the like thereto and informs this to the upper management entity through a M_ranging.indication (S1403). In order to transmit an appropriate response to the received ranging request, the

TABLE 16

| Name | Type | Valid Range | Description |
|---|---|---|---|
| Source | | | Start point of Confirmation |
| Destination | | | Target point to which Confirmation is delivered |
| Code | Enumeration | SA Add<br>Auth Request<br>Auth Reply<br>Auth Reject<br>Key Request<br>Key Reply<br>Key Reject<br>Auth Invalid<br>TEK Invalid<br>Auth Info<br>EAP-transfer<br>EAP Establish-Key Request<br>EAP Establish-Key Reply<br>EAP Establish-Key Reject<br>EAP Establish-Key Confirm<br>Pre-Auth-Request<br>Pre-Auth-Reply<br>Pre-Auth-Reject | |
| PKM Identifier | | | Used to find corresponding response of BS with respect to MS request. MS increases this value by "1" for a 256 value cycle whenever a "new" PKM message is transmitted. |
| AUTH-Key | | | Authorization (AUTH) key, encrypted with the target client PSS's public key |
| Key-Lifetime | | | AK's active lifetime |
| Key-Sequence-Number | | | AK's sequence number |
| SA Descriptors | | | Each compound SA-Descriptor attribute specifies a SAID and additional properties of the SA | upper management entity includes the parameters necessary for the M_Ranging.response or the progress status and transmits to the MAC (S1404).

The parameter or ranging progress status received through the M_Ranging.response is included in a ranging response and transmitted (S1405). The parameter or progress status in the transmitted RNG-RSP is informed to the upper management entity through a M_Ranging.confirmation (S1406). If additional ranging procedures are needed, the upper management entity transmits a M_Ranging.request to the mobile station MAC to allow the mobile station to continue performing the ranging procedures (S1407).

In this embodiment, as an example of requiring additional operations such as setting radio parameters, the ranging CDMA code is transmitted again (S1408). Radio signal information and the like are included in the ranging code received by the mobile station and then informed to the upper management entity (S1409). The results of any ranging in progress are informed to the base station MAC (S1410). This result is included in the RNG-RSP and transmitted to the mobile station (S1411). The transmitted result is informed to the mobile station upper management entity (S1412).

To perform the remaining ranging procedures, the upper management entity performs another ranging request (S1413). Here, the mobile station is in a state that tuning of radio signals and the like have been completed and the mobile station MAC address is included and transmitted for reception of necessary parameters for network access.

A ranging request is performed with the mobile station MAC address included (S1414), and the parameters including the mobile station address that exist in the received ranging request are delivered to the upper management entity (S1415). A M_Ranging.response is transmitted to the MAC layer after a Management Connection ID is included such that the mobile station can complete the ranging procedures for network access (S1416). The parameters included in the received primitive are included in the RNG-RSP and transmitted to the mobile station via the air interface (S1417). The information transmitted to the MAC are delivered to the upper management entity (S1418).

Figure 15:
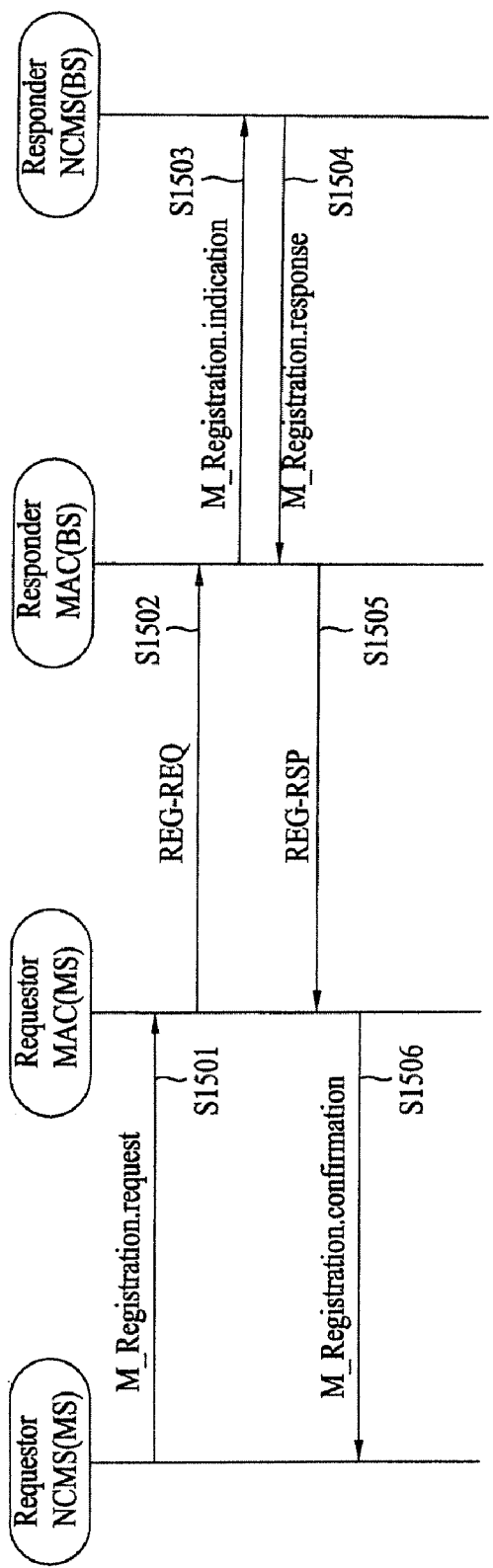
FIG. 15 depicts a flow chart of an exemplary embodiment for a registration procedure.

FIG. 15 depicts a flow chart of an exemplary embodiment for a registration procedure. As shown in FIG. 15, the upper management entity transmits a primitive to the MAC layer such that the mobile station performs registration (S1501). Here, the upper management entity can set and deliver the parameters such that the mobile station can determine the TLV values and the like that need to be included.

Upon including the values transmitted from the upper management entity and including other parameters needed for registration, the REG-REQ is transmitted to the base station (S1502). Upon receiving the REG-REQ, the base station MAC layer informs the upper management entity about the parameters included therein through a M_Ranging.indication (S1503).

Parameters that have been negotiated or that can be supported for completing registration are included in the M_Registration.response and delivered to the base station MAC layer (S1504). The parameters delivered by and received from the upper management entity are included in a REG-RSP and transmitted over the air interface (S1505). The values of the REG-RSP received via the air interface are delivered to the upper management entity via an M_Registration.confirmation (S1506).

Figure 16:
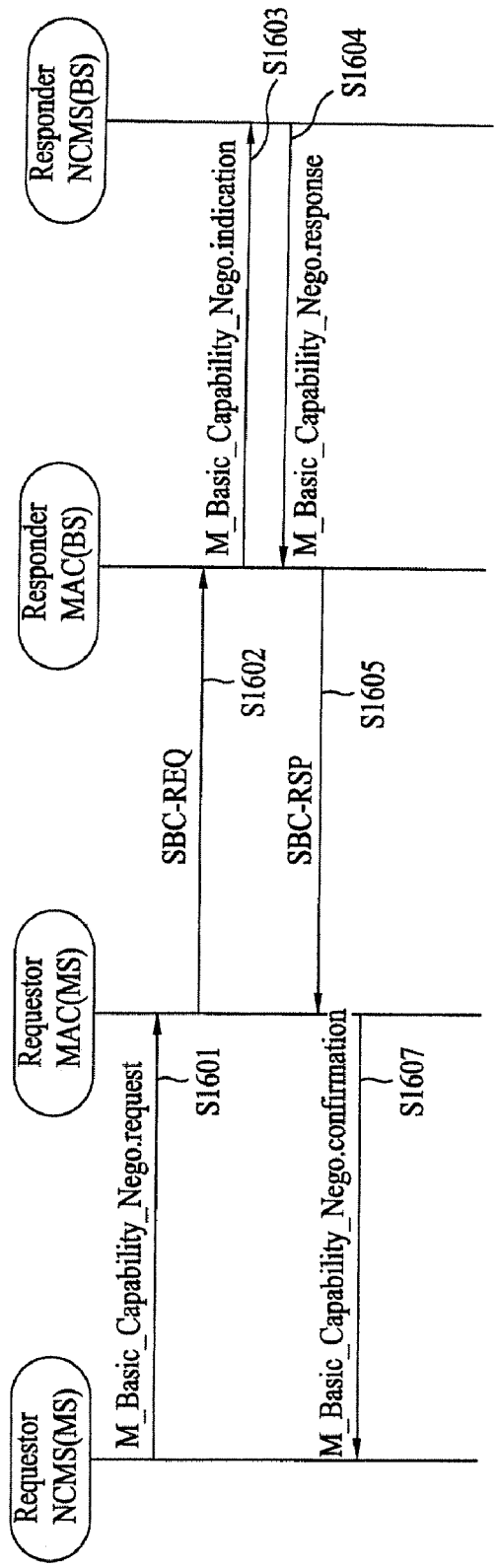
FIG. 16 depicts a flow chart of an exemplary embodiment for a basic function negotiation procedure.

FIG. 16 depicts a flow chart of an exemplary embodiment for a basic function negotiation procedure. As shown in FIG. 16, the upper management entity transmits a primitive to the MAC layer such that the mobile station can perform basic capability negotiation (S1601). Here, the upper management entity can set and deliver the parameters such that the mobile station can determine the TLV values and the like that need to be included.

The values transmitted from the upper management layer or other parameters needed for registration are included into a SBC-REQ that is transmitted to the base station (S1602). Upon receiving the SBC-REQ, the base station MAC layer informs the parameters included therein to the upper management entity by means of an M_Basic_Capability_Nego.indication (S1603). Parameters that have been negotiated or that can be supported for completing registration are included in the M_Basic_Capability_Nego.response and delivered to the base station MAC layer (S1604).

The parameters delivered by and received from the upper management entity are included in a SBC-RSP and transmitted over the air interface (S1605). The values of the SBC-RSP received via the air interface are delivered to the upper management entity via an M_Basic_Capability_Nego.confirmation (S1607).

Figure 17:
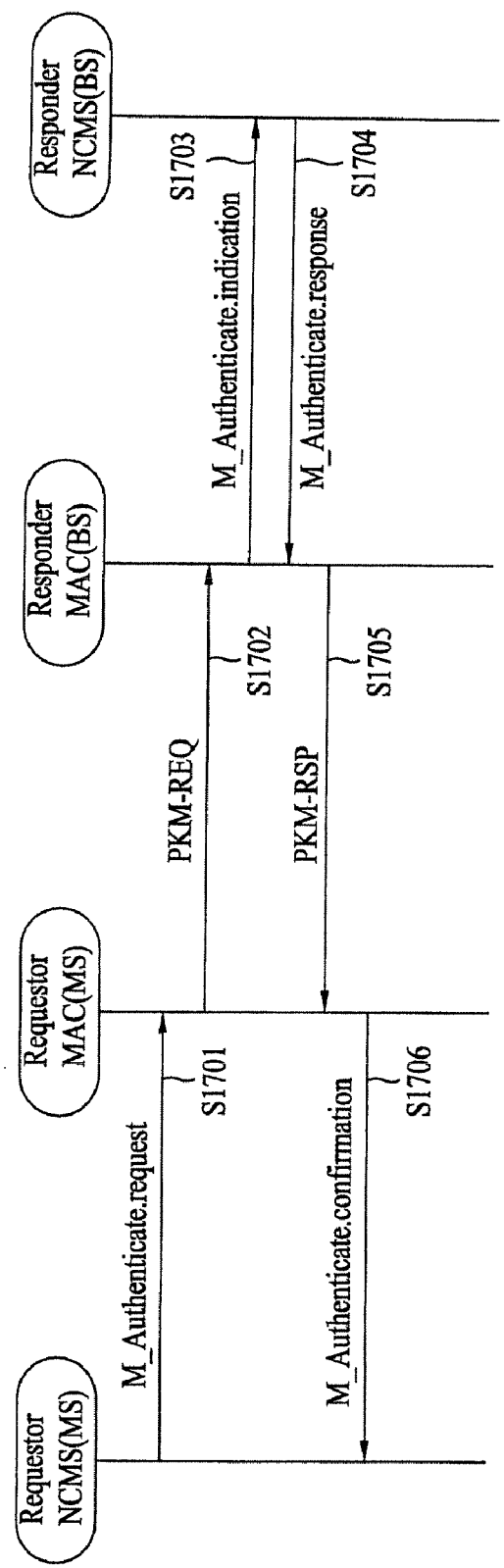
FIG. 17 depicts a flow chart of an exemplary embodiment for an authentication and authorization procedure.

FIG. 17 depicts a flow chart of an exemplary embodiment for an authentication and authorization procedure. As shown in FIG. 17, the upper management entity transmits a primitive to the MAC layer such that the mobile station receives authentication (S1701). Here, upon including the values transmitted from the upper management entity and including other parameters needed for registration, the PKM-REQ is transmitted to the base station (S1702).

Upon receiving the PKM-REQ, the base station MAC layer informs the upper management entity about the parameters included therein through a M_Authenticate.indication (S1703).

To complete the authentication procedures, the results handled by the upper management entity or a network authentication entity are included in the M_Authenticate.response and delivered to the base station MAC layer (S1704). The parameters delivered by and received from the upper management entity are included in a PKM-RSP and transmitted over the air interface (S1705). The values of the PKM-RSP received via the air interface are delivered to the upper management entity via an M_Authenticate.confirmation (S1706).

To implement the various features described above, the present invention can employ various types of hardware and/or software components (modules). For example, different hardware modules may contain various circuits and components necessary to perform the steps of the above method of executing scanning in a broadband wireless access system. Also, different software modules (executed by processors and/or other hardware) may contain various codes and protocols necessary to perform the steps of the present invention method.

For ranging (viewpoint of MS MAC), the present invention provides a method of ranging for a broadband wireless access system, the method comprising: receiving, from a mobile station (MS) Network Control and Management System (NCMS), a first primitive that indicates a ranging request; transmitting a ranging request containing ranging information to a base station medium access control (MAC) layer; and receiving a ranging response from the base station MAC layer. The method may further comprise: sending, to the MS NCMS, a second primitive that indicates a result of the performed ranging. The ranging information includes an initial ranging. The ranging information further includes at least one of a handover (HO) ranging, location update ranging, and periodic ranging. The ranging request indicates network entry. The network entry is for entry to a 802.16 network. The above steps are repeated until ranging is successful. The ranging request includes a CODE or a MAC ADDRESS.

For ranging (viewpoint of BS MAC), the present invention provides a method of ranging for a broadband wireless access system, the method comprising: receiving, from a mobile station (MS) medium access control (MAC) layer, a ranging request message containing ranging information; and sending, to a base station (BS) Network Control and Management System (NCMS), a first primitive that indicates a ranging request has been received. The ranging information includes at least one of a CDMA code, MS MAC address, MAC version, requested downlink burst profile, serving BS ID, target BS ID, handover (HO) indication, location update request, and paging controller ID. The method may further comprise: receiving, from the BS NCMS, a second primitive that indicates a ranging has been performed; and transmitting, to the MS MAC, a ranging response. The ranging response contains information of the second primitive that includes at least one of Result Code, Management CIDs, resource retain flags, handover (HO) process optimization, location update response, paging information, paging controller ID, next periodic ranging.

For registration (viewpoint of MS), the present invention provides a method of registration for a broadband wireless access system, the method comprising: receiving, from a base station (BS), a registration response; and sending, to a Network Control and Management System (NCMS), a second primitive indicating registration confirmation. The second primitive comprises at least one of a method of allocation an IP address, IP version, and skip address acquisition. The method of allocation an IP address includes DHCP, mobile IPv4, DHCP v6, IPv6 stateless address autoconfiguration. The skip address acquisition includes at least one of no IP address change, and re-acquire IP address. The receiving procedure indicates that network entry has been completed. The method may further comprise: receiving, from a MS NCMS, a first primitive to request registration; and sending, to a BS MAC, a registration request message. The first primitive comprises at least one of IP version, method of allocation IP address, previous IP address. The method of allocating an IP address includes DHCP, mobile IPv4, DHCP v6, IPv6 stateless address autoconfiguration.

For registration (viewpoint of BS MAC), the present invention provides a method of registration for a broadband wireless access system, the method comprising: receiving, from a mobile station (MS) medium access control (MAC) layer, a registration request message; sending, to a base station (BS) Network Control and Management System (NCMS), a first primitive that indicates a registration indication; receiving, from the BS NCMS, a second primitive that indicates a registration response; and sending, to the MS MAC, a registration response message. The first primitive comprises at least one of IP version, method of allocation IP address, previous IP address. The method of allocating an IP address includes DHCP, mobile IPv4, DHCP v6, IPv6 stateless address autoconfiguration. The second primitive comprises at least one of a method of allocation an IP address, IP version, and skip address acquisition. The method of allocation an IP address includes DHCP, mobile IPv4, DHCP v6, IPv6 stateless address autoconfiguration. The skip address acquisition includes at least one of no IP address change, and re-acquire IP address.

For registration (viewpoint of MIH for MS), the present invention provides a method of registration for a broadband wireless access system, the method comprising: receiving, from a Network Control and Management System (NCMS), a second primitive that indicates a result of a performed registration in order to receive an indication that a link setup procedure has been completed, wherein the second primitive is sent and received via at least one of a management service access point (M-SAP) and a control service access point (C-SAP). The second primitive comprises at least one of a method of allocation an IP address, IP version, and skip address acquisition. The method of allocation an IP address includes DHCP, mobile IPv4, DHCP v6, IPv6 stateless address autoconfiguration. The skip address acquisition includes at least one of no IP address change, and re-acquire IP address. The method may further comprise, before the receiving step: sending, to a Network Control and Management System (NCMS), a first primitive that indicates a registration request, wherein the first primitive is sent and received via at least one of a management service access point (M-SAP) and a control service access point (C-SAP). The method may further comprise: establishing a unified interface to an upper layer of a mobile station for managing messages to and from at least one of a homogeneous network and a heterogeneous network.

As for the results of the present invention, when the mobile station performs scanning by using the primitives defined according to the present invention, accurate operations within the protocol stack layers can be achieved. Accordingly, Media Independent Handover (MIH) procedures can be achieved because the NCMS and MIH layer can communicate in a direct or indirect manner through use of the primitives.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method for performing a ranging procedure between a mobile station (MS) and a base station (BS) in a broadband wireless access system, the method performed by an entity within the MS and comprising:

receiving, from an MS Network Control and Management System (NCMS), a first primitive comprising a type field indicating a location update, wherein the first primitive causes the location update to be performed via a transmission of a ranging request to the BS;

transmitting the ranging request comprising ranging information to the BS to perform the location update, wherein the ranging information is related to the location update;

receiving a ranging response from the BS; and transmitting a second primitive to the MS NCMS to provide a result of the ranging response, wherein the second primitive comprises a location update result and a paging controller ID, wherein the second primitive further comprises paging information when the location update result indicates a successful location update, the paging information comprising a paging offset, a paging group ID and a paging period.

2. The method of claim 1, wherein the first primitive is received from the MS NCMS through a control service access point (C-SAP).

3. The method of claim 2, wherein the C-SAP is used to support handover functions, idle mode functions, and radio resource management functions.

4. The method of claim 1, wherein the second primitive is transmitted to the MS NCMS through a control service access point (C-SAP).

5. The method of claim 4, wherein the C-SAP is used to support handover functions, idle mode functions, and radio resource management functions.

6. The method of claim 1, wherein the MS is a multi-mode MS.

7. The method of claim 1, wherein the second primitive further comprises an MS medium access control (MAC) address.

* * * * *